United States Patent [19]
Whitehouse

[11] Patent Number: 5,659,939
[45] Date of Patent: Aug. 26, 1997

[54] POSITIONING SYSTEM FOR SUPPORTING STRUCTURAL COMPONENTS DURING ASSEMBLY

[75] Inventor: James A. Whitehouse, Gig Harbor, Wash.

[73] Assignee: Nicholson Manufacturing Company, Seattle, Wash.

[21] Appl. No.: 372,051

[22] Filed: Jan. 12, 1995

[51] Int. Cl.$^6$ ..................................................... B23Q 3/00
[52] U.S. Cl. .......................... 29/281.4; 269/296; 269/309; 269/900; 269/71
[58] Field of Search .................................. 269/900, 296, 269/297–301, 71, 73, 309, 310, 45, 20, 17; 29/281.4

[56] References Cited

U.S. PATENT DOCUMENTS

| | | | |
|---|---|---|---|
| 1,001,619 | 8/1911 | Coffin | 269/296 |
| 3,559,980 | 2/1971 | Terai et al. | 269/309 |
| 4,463,937 | 8/1984 | Celette | 269/296 |
| 5,255,901 | 10/1993 | Rottler | 269/309 |
| 5,305,992 | 4/1994 | Kish | 269/296 |
| 5,462,263 | 10/1995 | Feltrin | 269/296 |

FOREIGN PATENT DOCUMENTS

| 2557701 | 9/1977 | Germany | 269/900 |
|---|---|---|---|

Primary Examiner—Robert C. Watson
Attorney, Agent, or Firm—Seed and Berry LLP

[57] ABSTRACT

An x-y-z motion jack unit is mounted on a base frame supported by precision made floor inserts at an assembly site. The inserts are precision positioned in the floor and each insert presents a horizontal support surface for the base frame and a vertical threaded bore receiving an anchoring pin provided by an anchoring unit mounted on the base frame. Multiple of the jack units can be integrated into a computerized adjustment system for positioning aircraft structural components during assembly.

15 Claims, 9 Drawing Sheets

5,659,939

POSITIONING SYSTEM FOR SUPPORTING STRUCTURAL COMPONENTS DURING ASSEMBLY

TECHNICAL FIELD

The present invention relates to the production of airplanes, and more particularly to the positioning and jacking system used at the assembly site to support and manipulate the airplane sections.

BACKGROUND OF THE INVENTION

During the assembly of airplane fuselage and wing sections at a production site precision x-y-z motion jacks have been used to support, align and interfit the sections. These special jacks have normally been mounted on large customized structures specifically designed for a single aircraft model. Such structures can be carts mounted on fixed rails in or on the floor, or on support frames anchored to the concrete floor by large bolts. These bolts have been threaded directly into the concrete or into expansion nuts or the like set into holes in the floor. This mounting technique normally involves shimming or grouting between the support frames and the floor to level the frames, and requires a complete redo for assembly of a different aircraft model.

The jack supporting structures are normally relatively large and support either single or multiple jacks. They seriously compete for floor space with necessary large work platform staging sections at the assembly site and intrude into the work and transport space needed for personnel, tools, parts and materials.

Since the jack supporting structures have been customized for a particular airplane model they normally can not be used for assembly of another model. Hence, the jack supporting structures have to be moved to a storage site or scrapped and special jack supporting structures for the second model moved onto the assembly site, positioned and precision leveled. This changing of the jack supporting structures is expensive and unduly time consuming and requires substantial storage space for the structures not in use.

Hence, there has been a need for an improved assembly support system having accurate and versatile jacking capabilities which does not require customizing for each airplane model, will permit fast adjustment for model changes, will take up less floor space, and does not require use of floor rails.

SUMMARY OF THE INVENTION

The present invention meets this need by permanently anchoring sets of inserts in the floor at the assembly site for mounting the bases of stand-alone x-y-z motion jacks. Each insert has a vertically adjustable screw plug presenting a precision horizontal support surface for a jack base and a threaded central vertical bore for receiving a positioning and anchoring pin mounted on the jack base. Preferably each jack base is mounted on four of the inserts. By standardizing the jack bases and the complementing pattern of the inserts it is possible to reuse the jack units for a new airplane model without modification merely by moving the jack units to other sets of inserts at the appropriate new positions. Since the top of the inserts can be flush with the floor level, the inserts not in use for a particular model do not intrude. Storage need only be provided for the jack units not required for assembly of the current model.

DETAILED DESCRIPTION OF THE INVENTION

Figure 1:
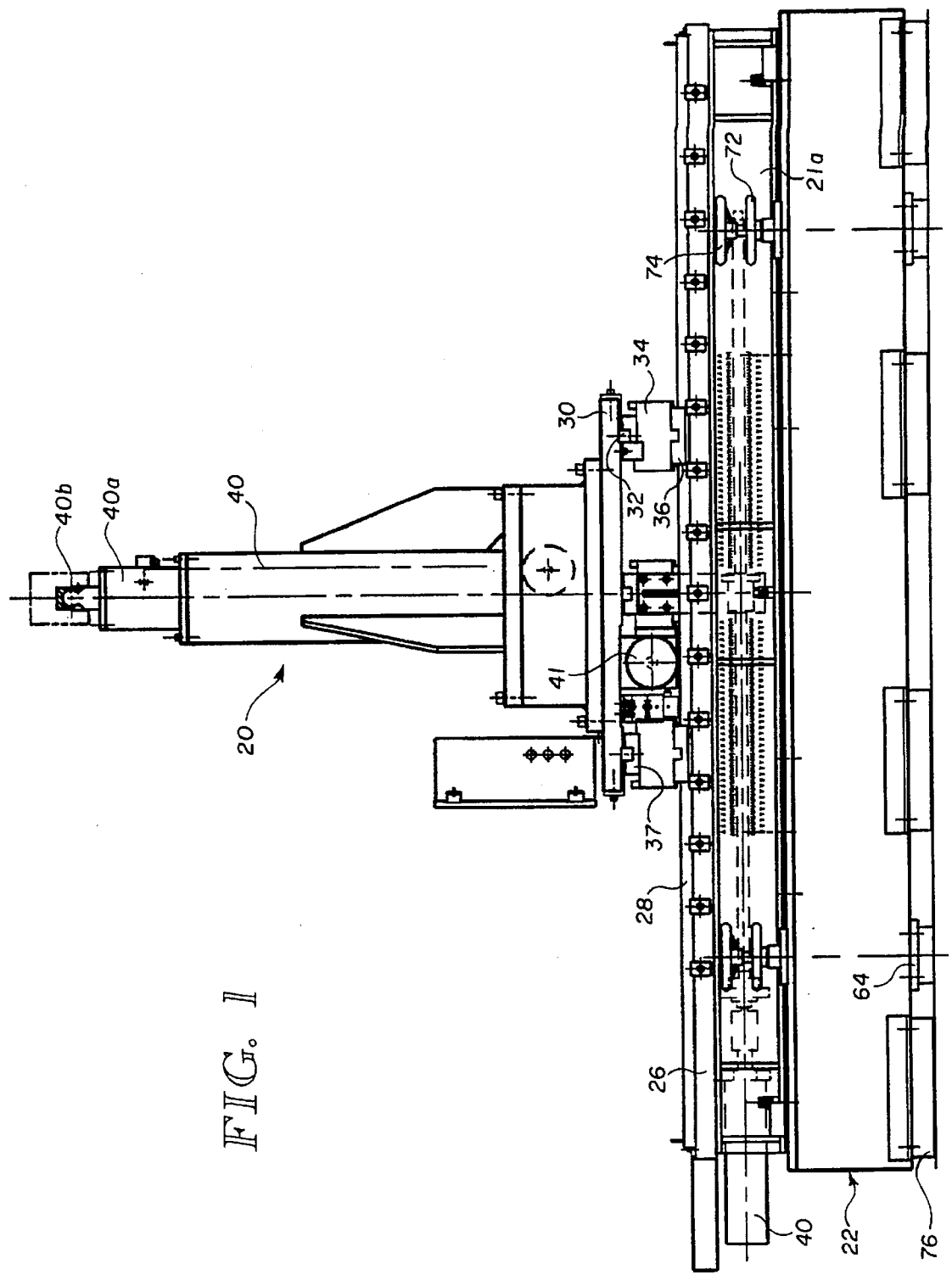
FIG. 1 is a side elevational view of am x-y-z motion jack unit used in the present invention.
Figure 2:
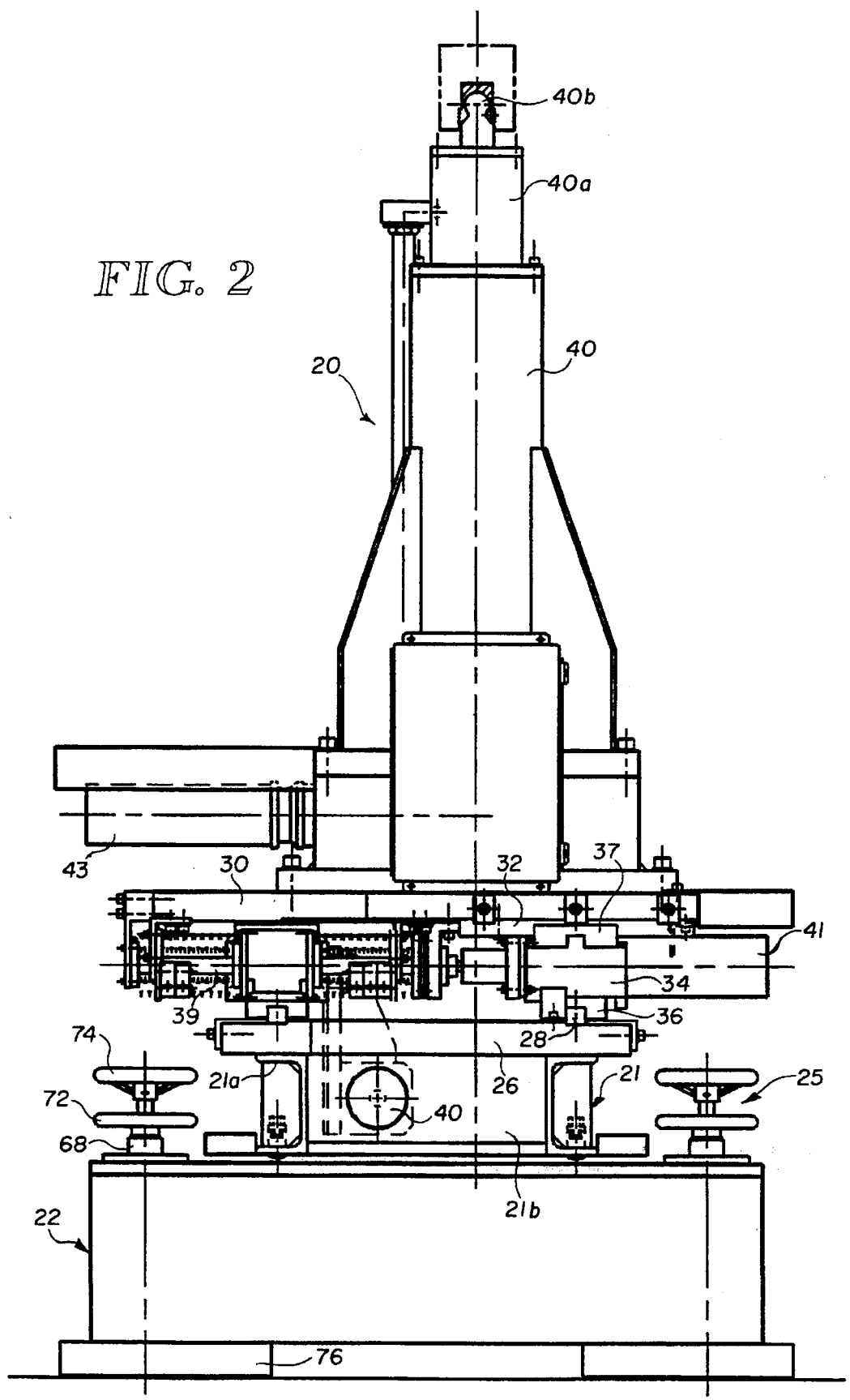
FIG. 2 is an end elevational view of the x-y-z motion jack unit.
Figure 3:
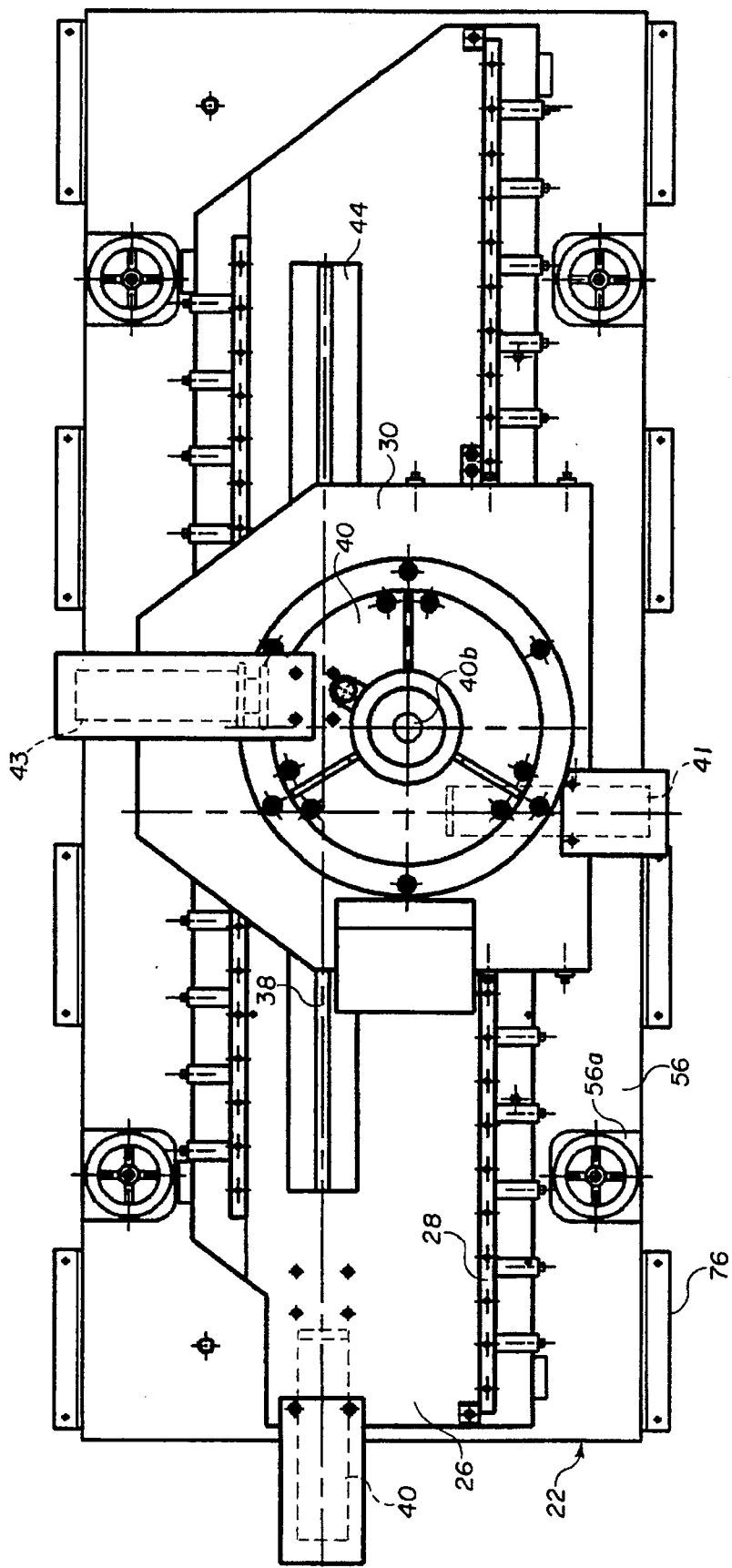
FIG. 3 is a plan view of the x-y-z motion jack unit.
Figure 4:
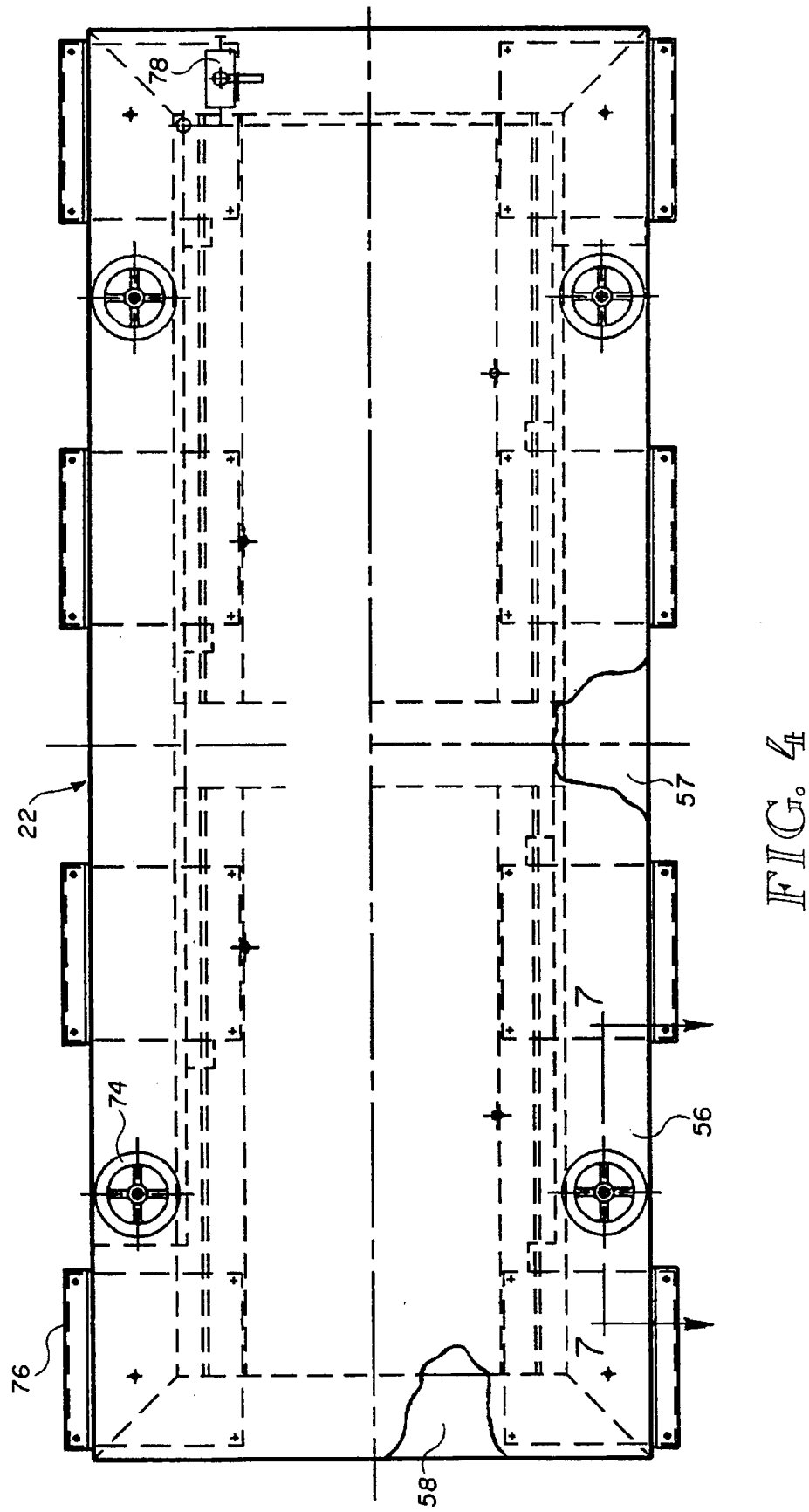
FIG. 4 is a plan view of the base frame on which the x-y-z motion jack assembly is mounted, shown equipped with anchoring units for floor insert units.

Referring to the drawings it is seen that the present invention utilizes an x-y-z motion servo jack unit 20 mounted on a subframe 21, a base frame 22 beneath the subframe, four floor insert units 24 on which the base frame 22 is mounted, and anchoring units 25 connecting the base frame 22 to the floor insert units 24. The jack unit 20 comprises a base plate 26 mounted on the subframe 21, a pair of X-axis rails 28 fixed on the base plate 26, an x-y motion table 30 spaced above the base plate 26, three Y-axis rails 32 mounted on the underside of the table 30, and spacer blocks 34. Each of these blocks has a bottom linear bearing 36 riding on one of the X-axis rails 28 and has a top linear bearing 37 riding on one of the y-axis rails 32. A Z-axis jack 40 is bolted on the table 30.

Ball screws 38, 39 driven by covered servo motors 40, 41 mounted on the underside and top of the base plate 26 move the spacer blocks 34 along the X-axis and Y-axis rails, and a servo motor 43 drives a vertical screw to extend and retract the upper telescoping section 40a of the Z-axis jack 40. The ball screw 38 extends horizontally beneath the base plate 26 parallel to the X-axis rails 32 and its nut is connected to the table 30 by a bracket extending upwardly through a longitudinal slot 44 in the base plate. The ball screw 39 is parallel to the Y-axis 32 and its nut is also connected to the table 30. At its upper end the jack 40 may have a ball joint fitting 40b for fitting a positioning socket in the airplane section to be engaged.

The described x-y-z motion servo jack unit 20 is a standard precision unit manufactured by the Nicholson Manufacturing Company, Seattle, Wash., under the trademark NICJAC, and is shown herein as an example of a jack unit which may be utilized in the practice of the present invention. Other suitable precision x-y-z motion servo jack units can also be used.

Directing attention to the insert units 24, each insert unit 24 comprises an insert 50, screw plug 51, and set screws 52. Insert 50 is cylindrical and has a bottom anchoring flange 50a, a central threaded bore 50b, and an upper counter bore 50c. The screw plug 51, has an upper annular flange 51a fitting into the counterbore 50c and is provided with a pair of threaded vertical bores 51b for receiving set screws 52. A central threaded bore 51c with a tapered upper entry 51d is provided in the screw plug 51 to receive a complementing threaded part of one of the anchoring units 25 carried by the base frame 22. The latter comprises a rectangular base plate 56 mounted on longitudinal and lateral frame members 57, 58 which may be rectangular tubes.

The subframe 21 may be formed by pairs of longitudinal and lateral channels 21a, 21b, which are bolted to the base frame 22 in a precision manner. The base frame 22 has four hollow guide legs 60 projecting upwardly through holes in the bottom wall 57a of the longitudinal frame members 57. These legs 60 have bottom annular flanges 60a as feet which receive upwardly extending countersunk bolts 62 passing through bores 63 in the feet 60a and screwed into aligned threaded holes in spacer rings 64 and the bottom wall 57a. The legs 60 have axial guide bores 60b aligned with an opening 66 through the base plate 56 and upper wall 57b of the longitudinal frame members 57. A respective boss member 68 seats on a respective recessed flat section 56a on the base plate 56 and has a positioning neck 68a fitting into the opening 66.

Figure 5:
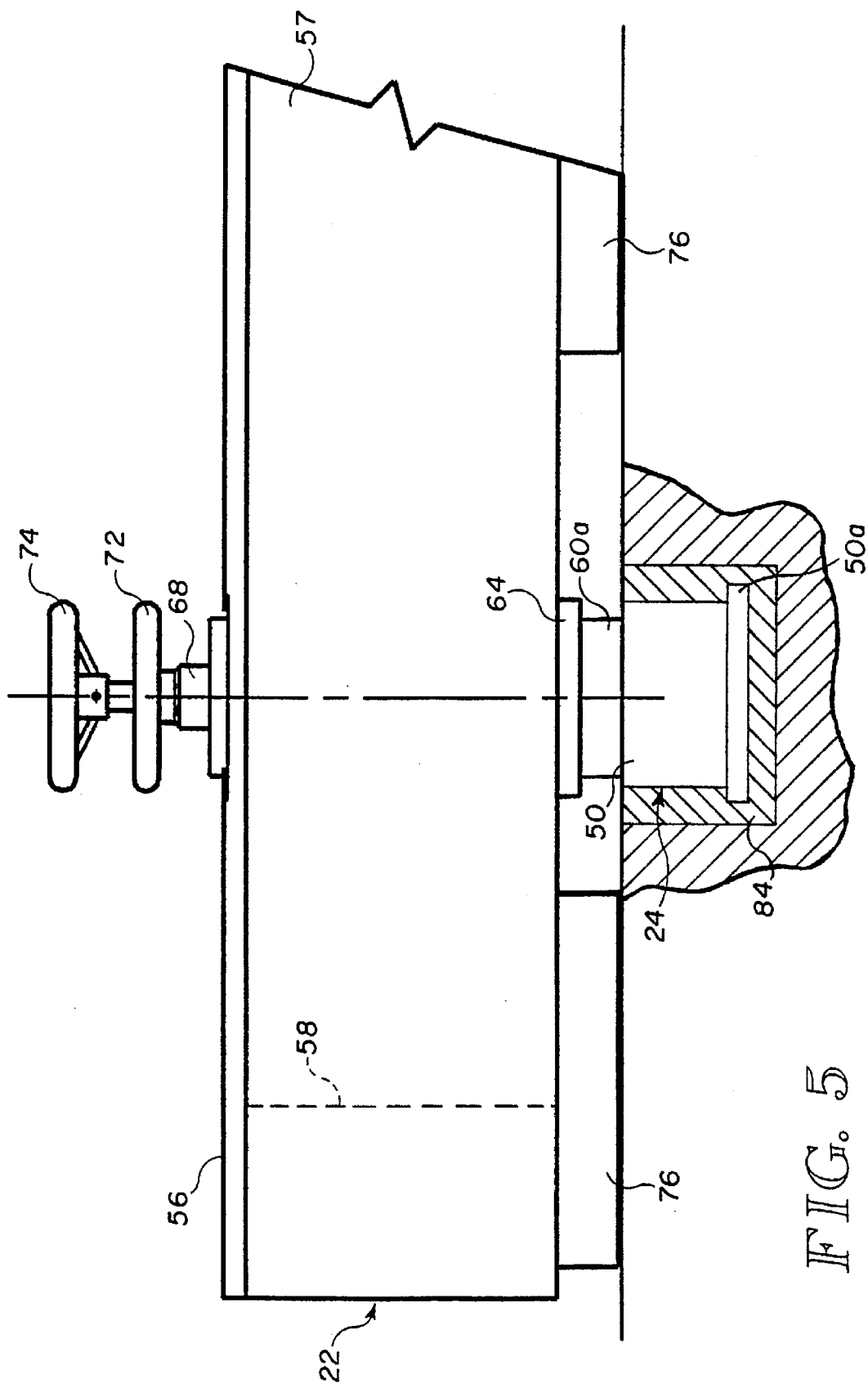
FIG. 5 is a fragmentary longitudinal side elevational view of the base frame with an anchoring unit shown in anchoring position.
Figure 6:
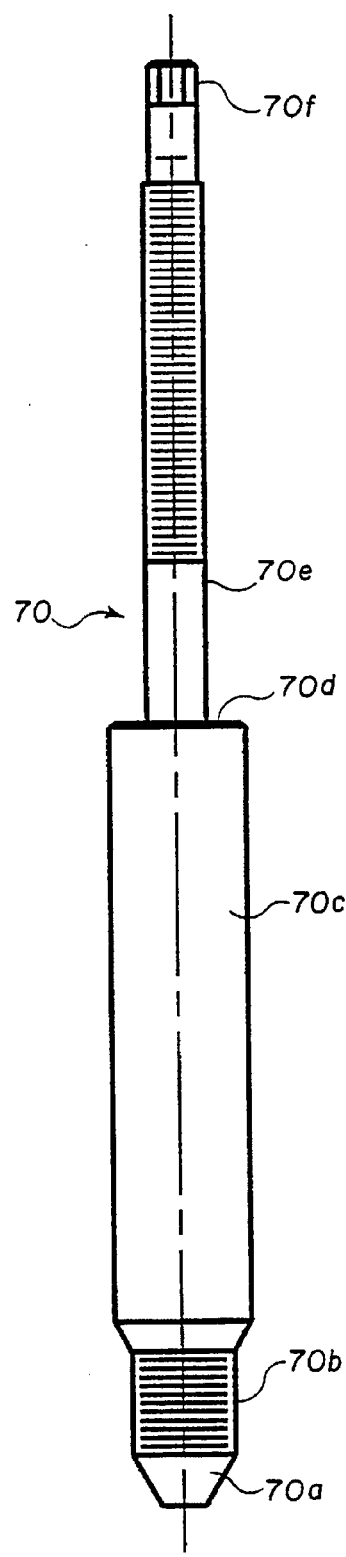
FIG. 6 is an elevational view of the pin component of the anchoring units.
Figure 7:
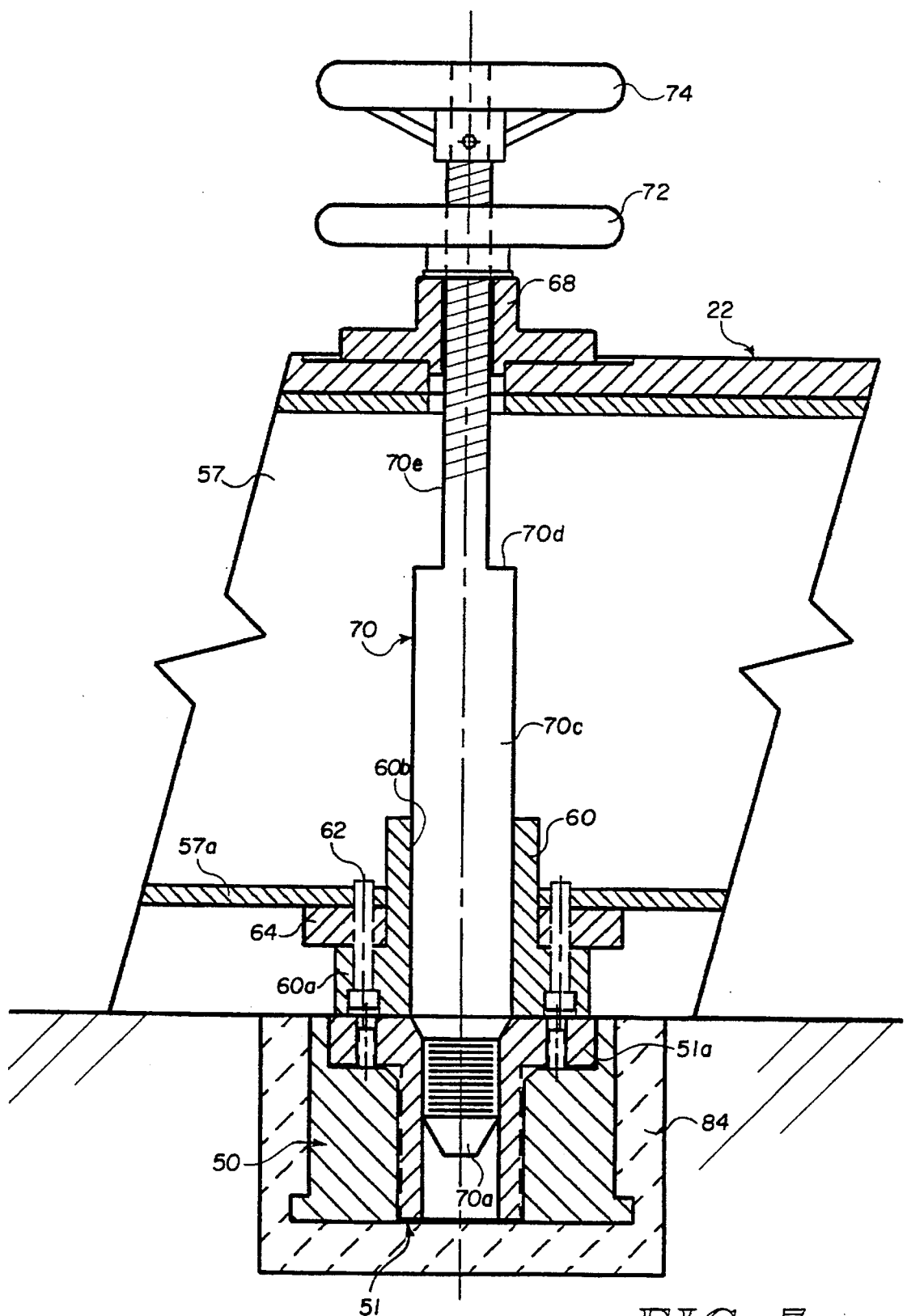
FIG. 7 is a fragmentary vertical sectional view taken as indicted by line 7—7 in FIG. 4 and showing an anchoring unit engaged with a floor insert unit.
Figure 8:
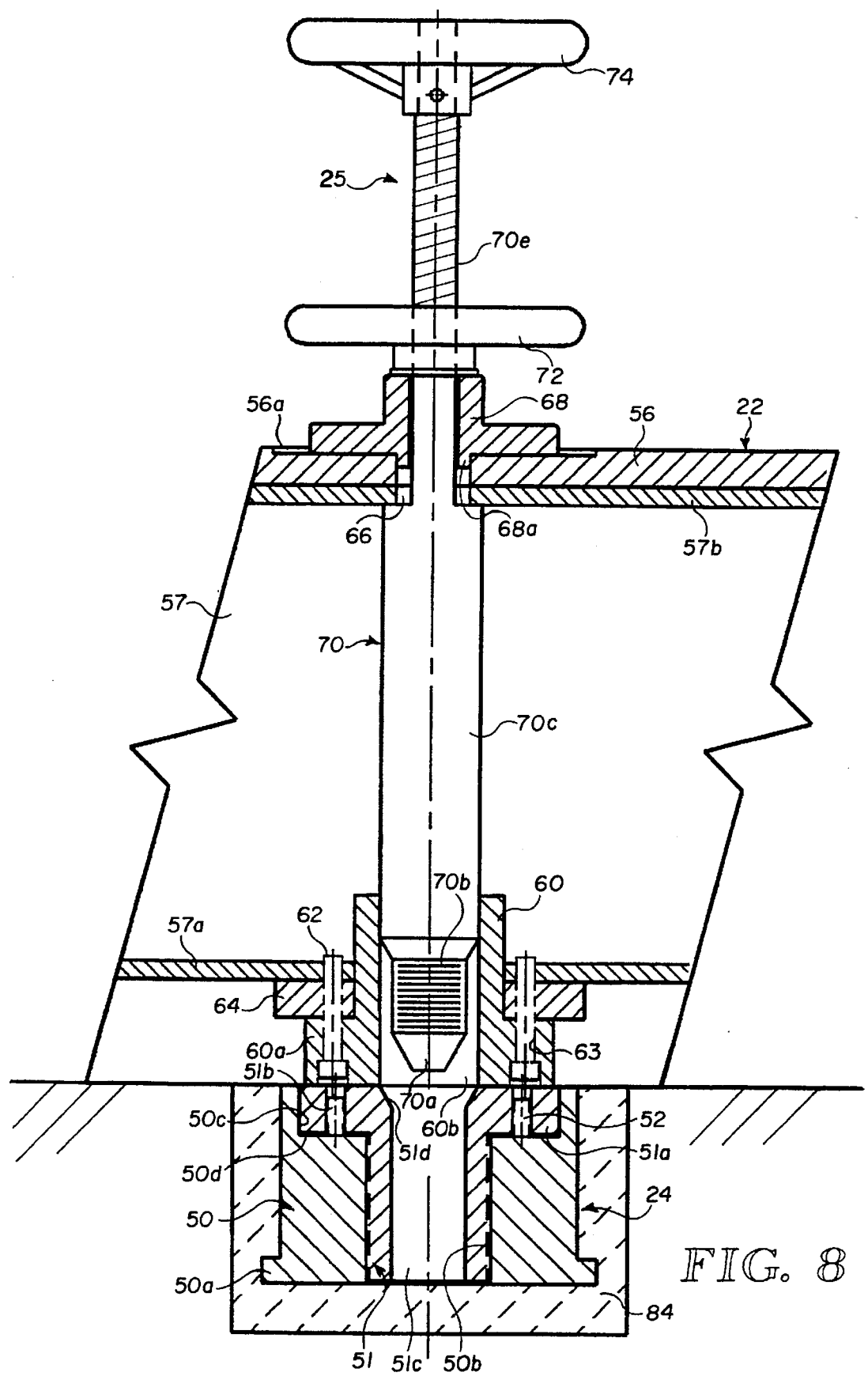
FIG. 8 is a sectional view like FIG. 6 and showing the anchoring unit disengaged from the floor insert unit.

Each anchoring unit 25 includes a stepped pin 70 (FIG. 5) having a tapered guide nose 70a joining a threaded anchoring section 70b, and having an enlarged guide section 70c and a stem section 70e of reduced diameter joining the guide section at a shoulder 70d. The stem section 70e is threaded along a major part of its length to receive a lock nut 72 having a hand wheel and is necked above the threaded portion and formed with a hex head 70f to receive a handwheel 74 which is pinned in position.

The anchoring units 25 are assembled by passing the pin 70 with the lock nut 72 and handwheel 74 removed, upwardly through the guide bore 60b in the appropriate leg 60 and passing the stem portion 70e through the boss 68. The nut 72 and handwheel 74 are then applied. The bore in the boss 68 is not threaded and freely passes the threaded and unthreaded portions of the stem 70d. When an anchoring unit 25 is in a fully raised retracted position the shoulder 70d engages the underside of the upper wall 57b of the related longitudinal frame member of the base frame 22.

Figure 9:
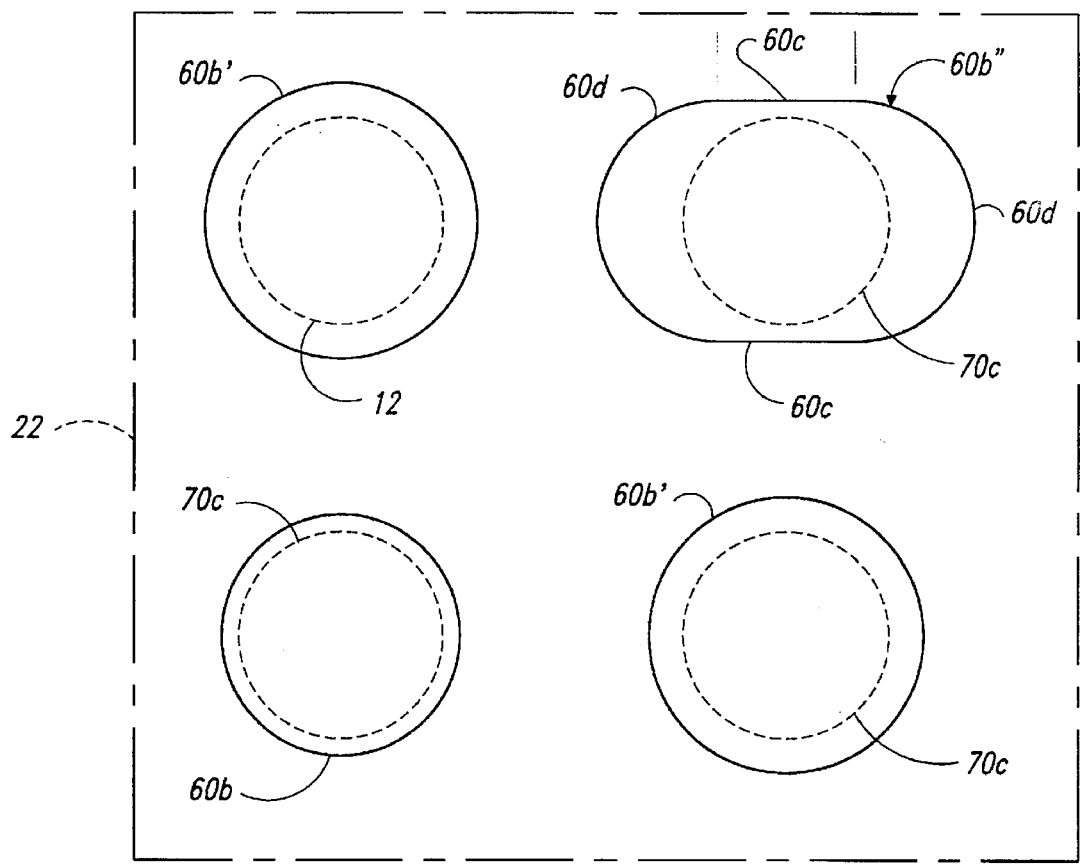
FIG. 9 is a schematic showing the horizontal tolerances for guiding the pin components of the four anchoring units.

The guide bores 60b in the four legs 60 preferably do not have the same tolerances relative to the guide sections 70c of the pins 70 to provide tolerance for the screw interfit between the threaded anchoring sections 70b of the pins 70 and the threaded center bores 51e in the insert plugs 51. FIG. 9, illustrates schematically a suitable tolerance layout in which the four guide bores 60b are shown in full lines and the circumference of the guide section 70c of the anchoring pins 70 is shown in broken lines. The tolerances have been exaggerated for illustrative purposes. The guide section bore 60b in the lower left hand corner of FIG. 9 is given a close tolerance and the guide section bores 60b' in the upper left corner and lower right corner are given a second more generous tolerance. At the upper right corner the guide section bore 60b" is made out of round by center narrow flats 60c between semi-circular portions 60d which may have the same diameter as the guide section bore 60b in the lower left hand corner having the closest tolerance. By way of example of the tolerances that can be used, if the guide bore 60b with the least tolerance is 2.005 inches in diameter for receiving a pin having a guide section diameter of 1.998 inches, the two guide bores 60b' can average 2.093 inches in diameter, and the flats 60c can have a horizontal length of about 0.125 inches. Preferably the flats 60c extend longitudinally of the base frame 22.

For ease of transport of the jack assemblies the base frames 22 are preferably provided on the underside with air bearings 76, four adjacent the corners, and preferably one or two additional pairs therebetween. When collapsed these air bearings 76 are confined above the level of the bottom of the feet 60a, and when charged with compressed air through a suitable manifold 78, they lift the feet 60a above the floor level.

In preparation for installation of a set of the inserts 24, four holes 80 are bored in appropriate locations in the concrete assembly floor 82. A jig frame, which may comprise a base frame 22 equipped with anchoring units 25, is used to accurately position the inserts 24 in the holes 80 as will now be explained. The anchoring units are suspended into the holes 80 by use of the anchoring units 25, namely, by screwing the lower threaded sections 70b into the bores 51c of the insert plugs 51 to bring the top surface of the plugs 51 against the feet 60a of the guide legs 60. This may be done when the jig is supported on shim blocks or spacers resting on the floor 82 and has been precision leveled so that the pins 70 are substantially perfectly vertical and so that the two respective pins 70 on each longitudinal side of the jig are parallel with a datum line representing the longitudinal center axis of the airplane to be assembled. With the inserts 24 suspended in the holes 80 in the floor, epoxy resin 84 or the like is poured into the holes to fill the holes under and around the inserts. When the resin 84 has set up, the set of four inserts 24 are anchored by the resin to the concrete of the floor 82 and are perfectly positioned relative to one another. Furthermore, the upper support surface of each insert plug 51, which initially is precision machined as a flat annular seat extending perpendicular to the threaded plug bore 51c, is perfectly level. Precision adjustment of an insert plug 51 so that all of the insert plugs are at exactly the same level can be made by screwing the plug 51 relative to the insert 50 in the respective vertical threaded bore 50b and then securing the adjustment by use of the set screws 52.

When the set of floor anchored inserts is to be used, one of the jack units is moved on its air bearings 76 to the site and is positioned so that the pin 70 in the lowest tolerance bore 60b (lower left bore 60b in FIG. 9) is positioned over the plug bore 61c of the appropriate insert unit 24. With the lock nut 72 having been screwed upwardly to a position adjacent the handwheel 74, the handwheel is turned to lower the tapered guide nose 70a of the pin 70 into the mouth of the insert plug bore 61c to exactly center the pin 70. Further turning of the handwheel 74 screws the threaded anchoring section 70b into the bore 61c.

Next the same procedure is followed to position the diagonally opposite pin 70 in its underlying insert. The tolerance created by the flats 60c in the guide bore 60b" makes it easy to guide the respective pin 70 into the bore 61c of the underlying insert unit. Then the remaining two pins 70 are screwed into their respective bores 61c. The four handwheels 74 are then turned to snugly seat the feet 60a on the upper face of the insert plugs 51, following which the lock nuts 72 are tightened to engage them with the heads of the bosses 68. At that time the longitudinal axis of the Z-axis jack 40 is perfectly vertical and the x-y motion table 30 is perfectly horizontal. The X-axis rails 32 are exactly parallel with horizontal longitudinal lines through the centers of the bores 60b in the two legs 60 on each longitudinal side of the base frame 22, this exact parallel relationship being established when the subframe 21 was precision mounted on the base frame 22. Accordingly, the servo motors 40–42 can be operated to accurately manipulate the position of the head of the Z-axis jack to a desired position. This accuracy permits several of the jack units 20 to be integrated into an automatic computerized system incorporating a self-leveling gravity referenced laser or other optical measuring device, and be simultaneously adjusted to accurately interfit fuselage or wing sections together which are supported by the jack units.

Since the base frames supporting the jack units can be relatively compact, as, for example, 2½ feet by 8½ feet, less room is required on the assembly floor for the jack units supporting the aircraft components. A pattern of insert sets can be established for each aircraft to be assembled. Since those sets not in use for a particular aircraft are flush with the floor, they do not interfere with the staging or the transport of personnel and materials. When an insert is not in use its plug bore 51c is preferably filled with a screw plug.

Although the invention has been described with reference to the assembly of aircraft, it will be understood that it is applicable to support and position structural components for other assembly operations.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. In a system for supporting and positioning fuselage and wing sections of an aircraft during assembly above a floor;
    a support element for engaging an aircraft section in selected elevated positions above said floor during aircraft assembly;
    a rigid base frame carrying said support element;
    a group of at least three positioning inserts anchored in said floor for collectively carrying said base frame;
    each of said inserts having a vertically adjustable screw plug on which said base frame is detachably mounted; and
    an adjustment mechanism mounted on said base frame for horizontally and vertically adjusting the position of said support element within a predetermined adjustment range of travel.

2. In a system according to claim 1, each said plug having a central vertical threaded bore, and respective anchoring devices screwed into said bores and mounted on said base frame.

3. In a system according to claim 1, said adjustment mechanism including a horizontal table with an x-y adjustment mechanism seated on said base frame, and a vertically adjustable jack mounted on said table and carrying said support element.

4. In a system according to claim 3, said base frame being rectangular and there being four said inserts, one located adjacent each corner of the base frame and four air bearings mounted beneath said base frame.

5. In a system according to claim 1, each said screw plug having a top horizontal support surface interrupted by a vertical threaded bore in the plug, said support surfaces being adjustable to the same level by vertical adjustment of said plugs in said inserts, said base frame being seated on said support surfaces with the latter in the same horizontal plane, and there being a hold-down device at each insert screwed into the respective plug and bearing down on the base frame to keep it seated.

6. In a system according to claim 1, said floor being concrete, and said inserts being positioned in holes in said concrete and being anchored in position by a bonding material filling between the inserts and the concrete.

7. In a system according to claim 1, transport devices mounted on said base frame for moving it, said support element, and said adjustment mechanism as a unit from one work site to another, said transport devices being adjustable between an inactive position and an active transporting position.

8. A system for supporting and positioning sections of an aircraft during assembly above a floor, said system comprising:
    groups of at least three positioning insert devices anchored in said floor, the insert devices in each group presenting horizontal support surfaces which are vertically adjustable to be coplanar, some of said groups being alike in arrangement and spacing of the inserts therein;
    multiple support and adjustment units detachably mounted on and solely supported by said support surfaces of respective said groups, each such unit supporting a respective support element for engaging an aircraft section during aircraft assembly, and each such unit being precisely horizontally and vertically adjustable within a preset adjustment range of travel while mounted on the support surfaces of a selected said group;
    there being matching said units for said alike groups.

9. A system according to claim 8 in which each of said units has transport devices which have an inactive position in which they are not load bearing when said units are mounted on said support surfaces, and are adjustable to an active load bearing position engaging said floor and raising said units out of engagement with said support surfaces for transporting said units between work or storage sites.

10. A system according to claim 8, in which control means are provided for controlling and coordinating adjustment of said units whereby the positions of adjacent aircraft sections supported by said units can be precisely adjusted relative to one another.

11. A system according to claim 8, in which each of said insert devices has a threaded vertical bore interrupting the respective said support surface, and in which said units have detachable hold-down devices adapted to be screwed into said bores for clamping and engage said support units to clamp the units in position.

12. In a positioning system,
    a floor;
    a group of insert units mounted in said floor, each insert having a vertical threaded bore and a support surface;
    a base frame having legs seated on said support surfaces;
    a respective hold-down pin extending downwardly through each said leg in sliding relationship therewith into the underlying threaded bore and retractable to at least the level of the bottom of the legs, said pin having a threaded portion at its lower end for screwing into the respective bore;
    air bearings adjacent said legs and having a retracted inactive position above the bottom level of said legs, and a load bearing position expanded below said bottom level;
    a vertical jack carried on said base frame for engaging an overhead member being positioned;
    said hold-down bolt being engageable with said bore while said air bearings are in load bearing position to aid in properly positioning said base frame over said inserts before lowering it into engagement with said support surfaces.

13. In a positioning system according to claim 12, a respective sleeve surrounding each pin and extending upwardly from each said leg, and a respective clamping nut operating on an upper threaded portion of each pin for bearing down on said base frame to selectively clamp it to the inserts.

14. A system for supporting and positioning fuselage and wing sections of an aircraft during assembly above a floor comprising:

- a support element for engaging an aircraft section in selected elevated positions above said floor during aircraft assembly;
- a group of at least three positioning inserts anchored in said floor;
- support and adjustment means detachably mounted on said inserts for supporting said support element, and for precisely horizontally and vertically adjusting the position of said support element within a predetermined adjustment range of travel;
- and air bearings beneath said support and adjustment means for ease of transporting it from one work site to another, said air bearings being adjustable between an inactive position and an active transporting position.

15. A system for supporting and positioning fuselage and wing sections of an aircraft during assembly above a floor comprising:

- a support element for engaging an aircraft section in selected elevated positions above said floor during aircraft assembly;
- a group of at least three positioning inserts anchored in said floor;
- support and adjustment means detachably mounted on said inserts for supporting said support element, and for precisely horizontally and vertically adjusting the position of said support element within a predetermined adjustment range of travel;
- said inserts each having a vertically adjustable screw plug with a top horizontal support surface interrupted by a vertical threaded bore in the plug, said support and adjustment means including a base frame seated on said support surfaces with the latter in the same horizontal plane;
- a hold-down device at each said insert screwed into the respective plug and bearing down on said base frame to keep it seated; and
- set screws threaded into said plugs for engaging the respective said inserts after the plugs have been adjusted relative to the inserts.

* * * * *